US012749174B2

(12) United States Patent
Dubovski et al.

(10) Patent No.: US 12,749,174 B2
(45) Date of Patent: Sep. 29, 2026

(54) OPTIMAL DETERMINATION OF AN OVERLAY TARGET USING MACHINE LEARNING

(71) Applicant: Applied Materials Israel Ltd., Rehovot (IL)

(72) Inventors: Bar Dubovski, Beit Hashmonay (IL); Ran Yacoby, Jerusalem (IL); Tung-Yuan Hsieh, Tainan City (TW); Kevin Ryan Houchens, Rehovot (IL); Tal Itzkovich, Tel-Aviv (IL); Nahum Bomshtein, Modi'in-Maccabim-Re'ut (IL); Jenny Perry, Rehovot (IL); Boris Levant, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 282 days.

(21) Appl. No.: 18/583,777

(22) Filed: Feb. 21, 2024

(65) Prior Publication Data

US 2024/0289940 A1 Aug. 29, 2024

Related U.S. Application Data

(60) Provisional application No. 63/447,879, filed on Feb. 23, 2023.

(51) Int. Cl.
*G06T 7/00* (2017.01)
*G06T 5/50* (2006.01)

(52) U.S. Cl.
CPC .............. *G06T 7/0006* (2013.01); *G06T 5/50* (2013.01); *G06T 2207/20221* (2013.01); *G06T 2207/30148* (2013.01)

(58) Field of Classification Search
CPC ..................... G06T 7/0006; G06T 5/50; G06T 2207/20221; G06T 2207/30148
See application file for complete search history.

(56) References Cited

U.S. PATENT DOCUMENTS

| | | | |
|---|---|---|---|
| 9,530,199 | B1 | 12/2016 | Weinberg et al. |
| 11,054,753 | B1 | 7/2021 | Kaplan et al. |

(Continued)

FOREIGN PATENT DOCUMENTS

| | | | | | |
|---|---|---|---|---|---|
| CN | 117314861 | A | * | 12/2023 | G06T 7/0004 |
| JP | 2023089034 | A | * | 6/2023 | G06N 3/09 |
| TW | 201728897 | A | * | 8/2017 | G06T 7/0004 |

*Primary Examiner* — Pinalben Patel
(74) *Attorney, Agent, or Firm* — Lowenstein Sandler LLP

(57) ABSTRACT

There are provided systems and methods comprising, for each given overlay target of a plurality of different overlay targets to be manufactured on a semiconductor specimen, said given overlay target comprising a plurality of stacked semiconductor layers, obtaining a design image of the given overlay target, feeding the design image to a trained machine learning model, to simulate at least one image of the given overlay target that would have been acquired by an electron beam examination system, using the at least one image to determine, before actual manufacturing of the given overlay target, data informative of at least one simulated overlay in the image, and using the data informative of the at least one simulated overlay of each given overlay target to select at least one optimal overlay target among the plurality of different overlay targets, the optimal overlay target being usable to be manufactured on the semiconductor specimen.

20 Claims, 9 Drawing Sheets

(56) References Cited

U.S. PATENT DOCUMENTS

| | | | | |
|---|---|---|---|---|
| 11,562,476 | B2 | 1/2023 | Peleg | |
| 12,131,458 | B2 | 10/2024 | Peleg | |
| 2011/0155904 | A1* | 6/2011 | Hotta | G03F 7/70466 250/311 |
| 2019/0178639 | A1* | 6/2019 | Gutman | G03F 7/70633 |
| 2024/0062355 | A1 | 2/2024 | Alumot et al. | |

* cited by examiner

OPTIMAL DETERMINATION OF AN OVERLAY TARGET USING MACHINE LEARNING

TECHNICAL FIELD

The presently disclosed subject matter relates, in general, to the field of examination of a specimen.

BACKGROUND

Current demands for high density and performance, associated with ultra large-scale integration of fabricated devices, require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

Examination processes are used at various steps during semiconductor fabrication to measure dimensions of the specimens (metrology), and/or to detect and classify defects on specimens (e.g., Automatic Defect Classification (ADC), Automatic Defect Review (ADR), etc.).

GENERAL DESCRIPTION

In accordance with certain aspects of the presently disclosed subject matter, there is provided a system comprising one or more processing circuitries, wherein the one or more processing circuitries are operative to implement a trained machine learning model, wherein the one or more processing circuitries are configured to, for each given overlay target of a plurality of different overlay targets to be manufactured on a semiconductor specimen, said given overlay target comprising a plurality of stacked semiconductor layers, obtain a design image of the given overlay target, feed the design image to a trained machine learning model, to simulate at least one image of the given overlay target that would have been acquired by an electron beam examination system, use the at least one image to determine, before actual manufacturing of the given overlay target, data informative of at least one simulated overlay in the at least one image, and use the data informative of the at least one simulated overlay of each given overlay target to select at least one optimal overlay target among the plurality of different overlay targets, wherein the at least one optimal overlay target is usable to be actually manufactured on the semiconductor specimen.

According to some examples, the system is configured to obtain one or more parameters of the electron beam examination system and feed the one or more parameters and the design image to the trained machine learning model, to simulate the at least one image of the given overlay target that would have been acquired by an electron beam examination system with said one or more parameters.

According to some examples, each given overlay target is associated with at least one given overlay value in the design data, wherein the system is configured to determine, for at least one given overlay target, data informative of a difference between the at least one simulated overlay and the at least one given overlay value, and to use the data informative of a difference between the at least one simulated overlay and the at least one given overlay value of the at least one given overlay target to update design data associated with the at least one given overlay target.

According to some examples, each given overlay target is associated with at least one given overlay value in the design data, wherein the system is configured to determine, for each given overlay target, data informative of a difference between the at least one simulated overlay and the at least one given overlay value and use said data to select said at least one optimal overlay target among the plurality of different overlay targets.

According to some examples, the system is configured to, for at least one given overlay target, for each given overlay value of a plurality of overlay values, feed a design image associated with the given overlay value to the trained machine learning model, to simulate an image of the given overlay target associated with the given overlay value, that would have been acquired by the electron beam examination system, thereby obtaining a set of a plurality of images, and before actual manufacturing of the given overlay target, determine, in each image of the set of a plurality of images, data informative of at least one given simulated overlay in the image.

According to some examples, the system is configured to determine, for each given overlay target, for each given overlay value of the plurality of overlay values, data informative of a difference between the given simulated overlay and the given overlay value, and use said data to select the at least one optimal overlay target among the plurality of different overlay targets.

According to some examples, the system is configured to, upon manufacturing of the optimal overlay target obtain an inspection image of the optimal overlay target acquired using an electron beam examination system, and determine at least one actual overlay based on the inspection image.

According to some examples, the optimal overlay target is associated with at least one given overlay value in the design data, wherein the system is configured to compare the at least one actual overlay with the at least one given overlay value associated with the optimal overlay target.

According to some examples, the system is configured to determine data informative of a quality of the inspection image.

According to some examples, the system enables user modification of a level of noise present in the at least one image generated by the machine learning model.

According to some examples, the system is configured to: (1) for each given overlay target of a first plurality of different overlay targets to be manufactured on a semiconductor specimen, said given overlay target comprising a plurality of stacked semiconductor layers, obtain a design image of the given overlay target, feed at least part of the design data to the trained machine learning model, to simulate at least one image of the given overlay target that would have been acquired by an electron beam examination system, use the at least one image to determine, before actual manufacturing of the given overlay target, data informative of at least one simulated overlay in the image data, and use the data informative of at least one simulated overlay of each given overlay target to select at least one optimal overlay target among the first plurality of different overlay targets, (2) upon manufacturing of the optimal overlay target, obtain an inspection image thereof, and use the inspection image to determine at least one actual overlay value, (3) repeat (1) for a second plurality of overlay targets, different from the first plurality of different targets.

According to some examples, the system is configured to perform a comparison between the at least one simulated overlay of the optimal overlay target with the at least one actual overlay value of the optimal overlay target, and output data informative of the comparison.

According to some examples, the trained machine learning model has been trained using a training set including, for each given manufactured overlay target of a plurality of manufactured overlay targets: at least one image of the given manufactured overlay target acquired by an electron beam examination system, a design image associated with the given manufactured overlay target and one or more parameters of the electron beam examination system.

According to some examples, at least one manufactured overlay target has been selected, before its manufacturing, among a plurality of different overlay targets to be manufactured on a semiconductor specimen, using operations comprising, for each given overlay target of the plurality of different overlay targets: obtaining design data of the given overlay target, using at least part of the design data to simulate image data of the given overlay target that would have been acquired by an electron beam examination system, using the image data to determine, before actual manufacturing of the given overlay target, second data informative of estimated probability that the given overlay target, upon being manufactured according to the design data, provides measurement data in an overlay measurement process meeting a measurement quality criterion, and using the second data of each given overlay target to select at least one optimal overlay target among the plurality of different overlay targets, wherein the at least one optimal overlay target corresponds, upon its manufacturing, to the at least one manufactured overlay target.

In accordance with other aspects of the presently disclosed subject matter, there is provided a method comprising, by one or more processing circuitries, for each given overlay target of a plurality of different overlay targets to be manufactured on a semiconductor specimen, said given overlay target comprising a plurality of stacked semiconductor layers, obtaining a design image of the given overlay target, feeding at least part of the design data to a trained machine learning model, to simulate at least one image of the given overlay target that would have been acquired by an electron beam examination system, using the at least one image to determine, before actual manufacturing of the given overlay target, data informative of at least one simulated overlay in the image, and using the data informative of the at least one simulated overlay of each given overlay target to select at least one optimal overlay target among the plurality of different overlay targets, wherein the at least one optimal overlay target is usable to be actually manufactured on the semiconductor specimen.

According to some examples, the method comprises obtaining one or more parameters of the electron beam examination system, and feeding the one or more parameters and the design image to the trained machine learning model, to simulate the at least one image of the given overlay target that would have been acquired by an electron beam examination system with said one or more parameters.

According to some examples, each given overlay target is associated with at least one given overlay value in the design data, wherein the method comprises determining, for at least one given overlay target, data informative of a difference between the at least one simulated overlay and the at least one given overlay value, and using the data informative of a difference between the at least one simulated overlay and the at least one given overlay value of the at least one given overlay target to update design data associated with the at least one given overlay target.

According to some examples, each given overlay target is associated with at least one given overlay value in the design data, wherein the method comprises determining, for each given overlay target, data informative of a difference between the at least one simulated overlay and the at least one given overlay value and use said data to select said at least one optimal overlay target among the plurality of different overlay targets.

According to some examples, the method comprises obtaining data informative of a plurality of overlay values, for at least one given overlay target, for each given overlay value of the plurality of overlay values, feeding at least part of the design data to the trained machine learning model, to simulate an image of the given overlay target associated with the given overlay value, that would have been acquired by the electron beam examination system, thereby obtaining a set of a plurality of images, and before actual manufacturing of the given overlay target, determine, in each image of the set of a plurality of images, data informative of at least one given simulated overlay in the image.

According to some examples, the method can implement one or more features described with reference to the system above.

In accordance with certain aspects of the presently disclosed subject matter, there is provided a non-transitory computer readable medium comprising instructions that, when executed by one or more processing circuitries, cause the one or more processing circuitries to perform operations as described above with respect to the method.

According to some examples, the proposed solution enables determining optimal overlay targets. According to some examples, the proposed solution automates determination of optimal overlay targets. According to some examples, the proposed solution improves overlay measurements in a semiconductor specimen. According to some examples, the proposed solution enables determining optimal overlay targets in a more efficient way, within a shorter time, and with a reduced number of manufacturing operations. According to some examples, the proposed solution requires less information on candidate overlay targets to select an optimal overlay target.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as “obtaining”, “feeding”, “using”, “comparing”, “simulating”, “determining”, “training”, “selecting”, or the like, refer to the action(s) and/or process(es) of a computer that manipulate and/or transform data into other data, said data represented as physical, such as electronic, quantities and/or said data representing the physical objects.

Figure 1:
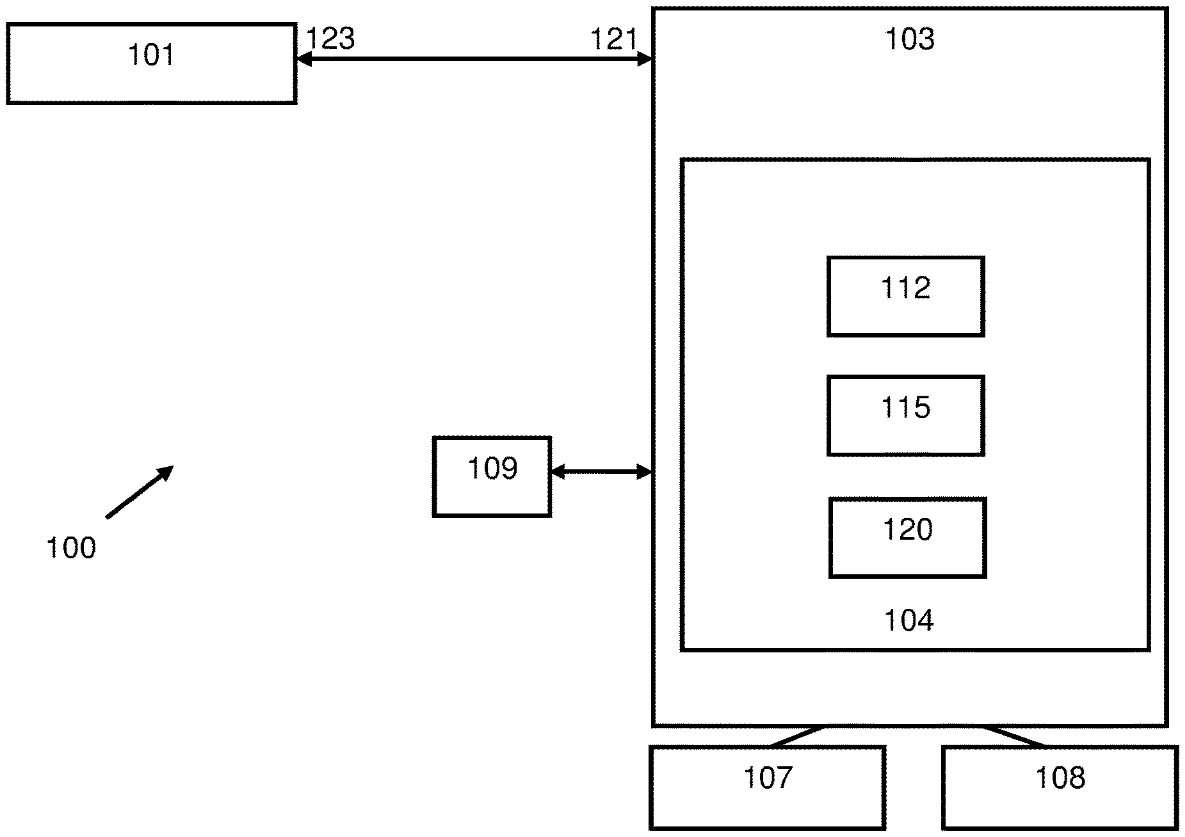
FIG. 1 illustrates a generalized block diagram of an examination system in accordance with certain embodiments of the presently disclosed subject matter.

The terms “computer” or “computer-based system” should be expansively construed to include any kind of hardware-based electronic device with a data processing circuitry (e.g., digital signal processor (DSP), a GPU, a TPU, a field programmable gate array (FPGA), an application specific integrated circuit (ASIC), microcontroller, microprocessor etc.), including, by way of non-limiting example, the computer-based system 103 of FIG. 1 and respective parts thereof disclosed in the present application. The data processing circuitry (designated hereinafter as processing circuitry) can comprise, for example, one or more processors operatively connected to one or more computer memories, loaded with executable instructions for executing operations, as further described below. The data processing circuitry encompasses a single processor or multiple processors, which may be located in the same geographical zone, or may, at least partially, be located in different zones, and may be able to communicate together.

The term “specimen” used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term “examination” used in this specification should be expansively construed to cover any kind of metrology-related operations, as well as operations related to detection and/or classification of defects in a specimen during its fabrication. Examination is provided by using non-destructive examination tools, during or after manufacture of the specimen to be examined. By way of non-limiting example, the examination process can include runtime scanning (in a single or in multiple scans), sampling, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term “examination” or its derivatives used in this specification are not limited with respect to resolution or size of an inspection area.

The term “design data” used in the specification should be expansively construed to cover any data indicative of hierarchical physical design (layout) of a specimen. In some examples, it can be informative of one or more three-dimensional structures. Design data can be provided by a respective designer and/or can be derived from the physical design (e.g., through complex simulation, simple geometric and Boolean operations, etc.). Design data can be provided in different formats such as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter, fewer, more, and/or different stages than those shown in the methods of FIGS. 3, 5A, 6, 7A and 8 may be executed. In embodiments of the presently disclosed subject matter, one or more stages illustrated in the methods of FIGS. 3, 5A, 6, 7A and 8 may be executed in a different order, and/or one or more groups of stages may be executed simultaneously.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g., of a wafer and/or parts thereof) as part of the specimen fabrication process. The illustrated examination system 100 comprises computer-based system 103. According to some examples, system 103 can generate various data informative of overlay. According to some examples, system 103 is capable of automatically determining metrology-related information and/or defect-related information using images obtained during specimen fabrication. System 103 can be operatively connected to one or more examination tools 101. The examination tool 101 is configured to capture images and/or to review the captured image(s) and/or to enable or provide measurements related to the captured image(s).

System 103 includes a processing circuitry 104, which includes one or more processors (not shown separately) and one or more memories (not shown separately). The processing circuitry 104 is configured to provide all processing necessary for operating the system 103, and, in particular, for processing the images captured by the examination tool(s) 101.

The processor of the processing circuitry 104 can be configured to execute one or more functional modules in accordance with computer-readable instructions implemented on a non-transitory computer-readable memory comprised in the processing circuitry 104. A functional module implemented by the processing circuitry 104 can include a machine learning model 120. According to some examples, the machine learning model 120 can include a Deep Neural Network (DNN). By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture or otherwise. Optionally, at least some of the layers can be organized in a plurality of DNN sub-networks. Each layer of DNN can include multiple basic computational elements (CE) typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g., the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of the machine learning model 120 can be initially selected prior to training, and can be further iteratively adjusted or modified during training to achieve an optimal set of weighting and/or threshold values in a trained ML network. After each iteration, a difference (also called loss function) can be determined between the actual output produced by ML network and the target output associated with the respective training set of data. The difference can be referred to as an error value. Training can be determined to be complete when a cost or loss function indicative of the error value is less than a predetermined value, or when a limited change in performance between iterations is achieved. Optionally, at least some of the ML subnetworks (if any) can be trained separately, prior to training the entire ML network.

A set of ML network input data used to adjust the weights/thresholds of a machine learning model (such as a deep neural network) is referred to hereinafter as a training set.

Figure 2A:
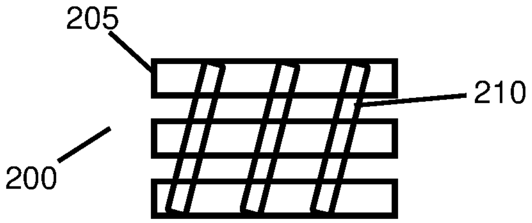
FIG. 2A illustrates a non-limitative example of a semiconductor specimen.
Figure 2B:
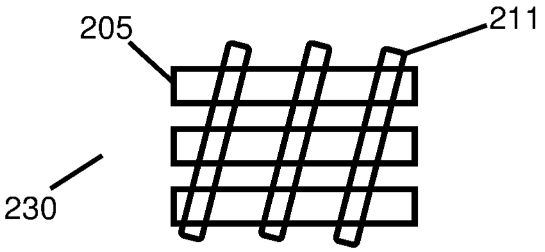
FIG. 2B illustrates a non-limitative example of an overlay target associated with the semiconductor specimen of FIG. 2A.

As mentioned above, system 103 is usable to generate various data informative of overlay. Overlay measurement includes the measurement of the alignment in a three-dimensional specimen, between different features (typically belonging to different layers) and/or between different layers. Non-limitative examples of features include gates, contacts, transistors, etc. In order to measure overlay (for a given specimen and/or for a given manufacturing process), targets (also called "overlay targets") can be manufactured on the specimen. An overlay target typically includes a plurality of stacked semiconductor layers. In some examples, the overlay target may differ from the actual design of the semiconductor specimen. This is performed intentionally, in order to facilitate overlay measurement. A non-limitative example is provided in FIGS. 2A and 2B. Assume that the actual design of a specimen 200 corresponds to the design depicted in FIG. 2A, in which a top layer of the specimen 200 includes features 205 and a bottom layer of the specimen 200 includes features 210. A non-limitative example of an overlay target 230 is illustrated in FIG. 2B, which includes a top layer with the same features 205 as the specimen 200, and a bottom layer with features 211, different from features 210. Features 211 differ from features 210 in that features 211 are longer than features 210. This design of the overlay target 230 facilitates overlay measurement between the top layer and the bottom layer, since features 211 can be more easily identified in an image (such as a SEM image) than features 210. Note that this design of an overlay target is only an example and is not limitative.

According to some examples, the processing circuitry 104 implements at least one simulation software 112. As explained hereinafter, the simulation software 112 is operative to receive design data of an overlay target, and parameters of an electron beam examination system (such as SEM), in order to simulate at least one image of the overlay target that would have been acquired by the electron beam examination system. In some examples, this can include simulating a first image simulating a SEM image acquired from secondary electrons (also called secondary electron image) and a second image simulating a SEM image acquired from backscattered electrons (also called backscattered image). For example, the simulation software 112 can correspond to the "CASINO" software (CASINO is the acronym of "monte CArlo SImulation of electroN trajectory in sOlids"). This is not limitative.

According to some examples, the processing circuitry 104 implements at least one overlay measurement software 115. As explained hereinafter, the overlay measurement software 115 is configured to receive an image (which can be a simulated image, or an actual image) of an overlay target (or of any other semiconductor specimen) including a plurality of stacked layers, and to determine overlay between different layers (and/or between different features belonging to different layers). According to some examples, the overlay measurement software 115 can use the methods described in U.S. Pat. Nos. 11,054,753, 9,530,199, or U.S. Ser. No. 17/893,082 (content of these documents are incorporated herein by reference). This is however not limitative and the overlay measurement software 115 can use other adapted existing overlay measurement methods.

System 103 is configured to receive input data. As explained hereinafter, input data can include design data and/or design images informative of a plurality of overlay targets, which can be stored e.g., in one or more data repositories 109. According to some examples, input data can include data 121 produced by the examination tool 101, which can include images (e.g., captured images, images derived from the captured images, simulated images, synthetic images, etc.) and associated numeric data (e.g., metadata, hand-crafted attributes, etc.). It is noted that image data can be received and processed together with metadata (e.g., pixel size, text description of defect type, parameters of image capturing process, etc.) associated therewith. It is further noted that image data can include data related to a layer of interest and/or to one or more other layers of the specimen. According to some examples, the processing circuitry 104 can send instructions 123 to the examination tool(s) 101.

By way of non-limiting example, a specimen can be examined by one or more examination tools 101 which can include a scanning electron microscope (SEM) and/or an Atomic Force Microscopy (AFM)) and/or any other adapted electron beam examination system. The resulting data (image data 121), informative of images of the specimen, can be transmitted—directly or via one or more intermediate systems—to system 103.

Upon processing the input data, system 103 can store the results (which can include for example data informative of overlay targets, such as selection of an optimal overlay target which is the most adapted to enable accurate overlay measurements, etc.) in storage system 107, render the results via GUI 108 and/or send them to an external system. As mentioned above, system 103 may use the results to send instructions to the examination tool(s) 101.

Figure 3:
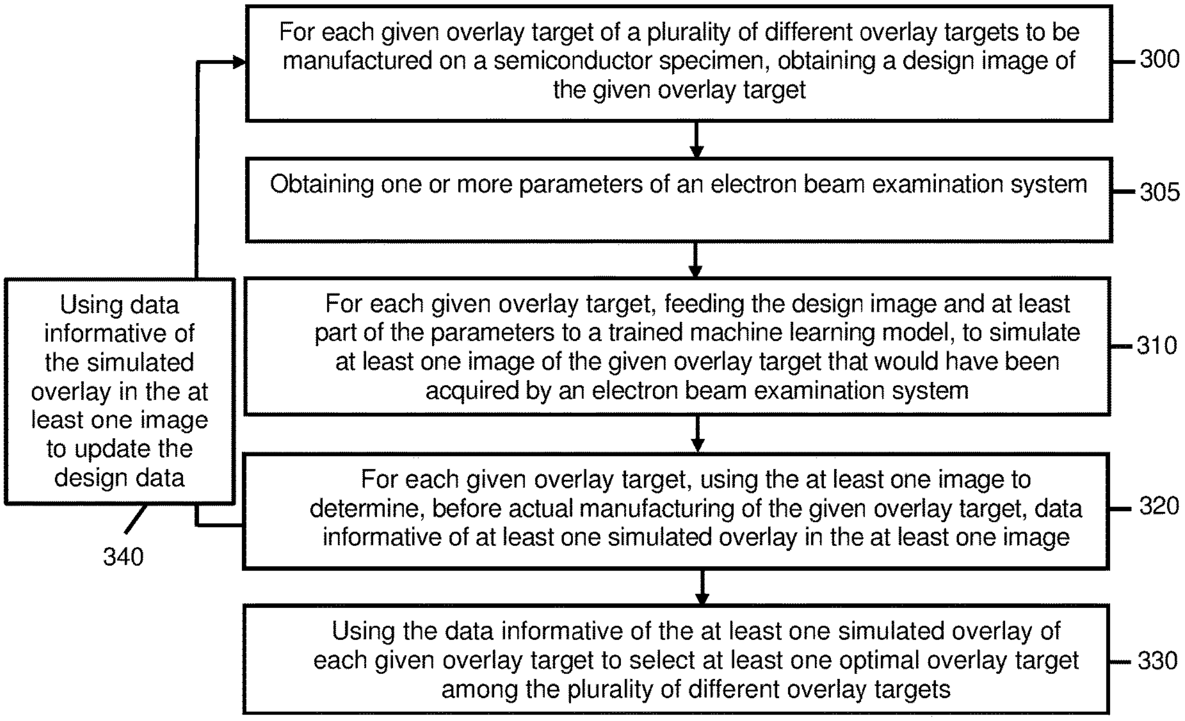
FIG. 3 illustrates a generalized flow-chart of a method of determining an optimal overlay target.

Attention is now drawn to FIG. 3, which depicts a method of selecting at least one overlay target (designated as optimal overlay target) among a plurality of (candidate) overlay targets, according to some examples of the invention.

Assume that a plurality of different overlay targets (candidate overlay targets) has been designed. As mentioned above, each overlay target includes a plurality of stacked semiconductor layers and can be used to determine overlay measurements. In some examples, the plurality of different overlay targets has been designed by a user (such as a semiconductor manufacturer), in order to determine overlay measurements for a given manufacturing process and/or for a given semiconductor specimen. In some examples, most or all of the overlay targets have not yet been manufactured, and have only been designed prior to their manufacturing. According to some examples, the method of FIG. 3 enables selecting one or more optimal overlay targets among the plurality of overlay targets (before actual manufacturing of the overlay targets), for which it is expected to obtain accurate overlay measurements.

The method of FIG. 3 includes obtaining (operation 300), for each given overlay target of the plurality of different overlay targets to be manufactured on a semiconductor specimen, a design image of the given overlay target. According to some examples, the design image can be generated by a user, using a dedicated design software. In some examples, the design image is a 2D binary image, such as a CAD image. According to some examples, the design image is informative of the geometry and/or layout (e.g., shapes of the features, layout of the features, frequency or repetition of the features, dimensions of the features or of the overlay target, distance between the features, pitch of the features, etc.). In some examples, the overlay targets can differ by at least one property, such as geometry and/or layout of one or more features, etc. (different design data). Note that with the method of FIG. 3, it is not required to obtain data such as the type of material and/or the density of the features of the candidate overlay targets to determine the optimal overlay target(s).

The design image can be for example provided by a manufacturer, since the manufacturer has detailed knowledge of the parameters of the manufacturing process and/or the properties of the specimen to be manufactured. This is however not limitative. In some examples, the various candidate overlay targets can be designed to test overlay of a given manufacturing process.

According to some examples, each overlay target can be associated with at least one or more overlay values. These overlay values define the overlay between features and/or layers of the overlay target. Note that for a given overlay target, it is possible to have several overlay values, since for each pair of layers, a different overlay value may be obtained. In addition, the overlay may be different depending on the axis (e.g., X axis and/or Y axis).

According to some embodiments, each overlay target can be associated with data informative of one or more different overlay values (overlay errors). This will be further discussed hereinafter with respect to FIG. 5. In some examples, the data informative of one or more overlay values may be part of design data associated with each overlay target. An overlay error corresponds to a deviation from a desired alignment of layers and/or features. For example, a user (such as a manufacturer) can indicate that for a given manufacturing process, it is expected to have an overlay error which varies between −2 nm and +2 nm (these values are not limitative). Data informative of one or more overlay values can include this expected range.

The method of FIG. 3 further includes (operation 305) obtaining one or more parameters of an electron beam examination system. These parameters can include acquisition parameters, such as (but not limited to) beam energy, landing energy, pixel size, field of view, etc. These parameters can correspond to acquisition parameters of an electron beam examination system that will be used to measure overlay of the manufactured overlay target(s).

The method of FIG. 3 further includes (operation 310), for each given overlay target, feeding the design image to the trained machine learning model 120, to simulate at least one image of the given overlay target that would have been acquired by an electron beam examination system. In particular, operation 310 can include feeding the design image and one or more parameters to the trained machine learning model 120, to simulate at least one image of the given overlay target that would have been acquired by an electron beam examination system with said one or more parameters. Note that the at least one image typically includes a 2D image, that simulates a SEM image. In some examples, the machine learning model 120 can generate a first image simulating a SEM image acquired from secondary electrons (also called secondary electron image) and a second image simulating a SEM image acquired from backscattered electrons (also called backscattered image). Note that these two images may reflect different depths of the target: one image may reflect the surface of the target and the other may reflect in-depth features of the target.

According to some examples, generation of the 2D image requires short processing time, since it relies on the usage of a trained machine learning model. In some examples, the machine learning model 120 is associated with a noise model, and the user can modify, in the noise model, the level of noise present in the 2D image. This enables generating different simulated images, with different levels of noise. In other examples, the level of noise present in the noise model is determined during the training of the machine learning model 120, as a parameter to determine (similarly to weights of the machine learning model 120, determined during the training).

Figure 4:
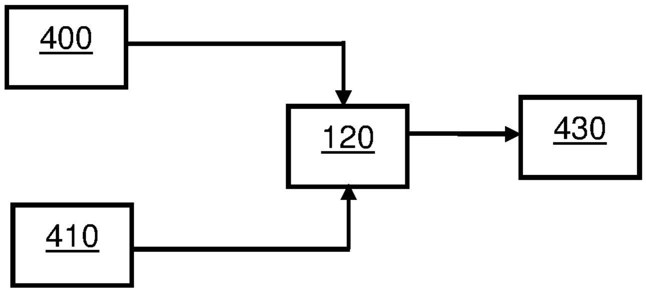
FIG. 4 illustrates an example of generating, by a machine learning model, simulated image data using a design image.

As illustrated in FIG. 4, according to some examples, operation 310 can include feeding the design image 400 and one or more parameters 410 of the electron beam examination system to the trained machine learning model 120, to simulate at least one image 430 of the given overlay target that would have been acquired by an electron beam examination system with said one or more parameters. Training method(s) enabling training of the machine learning model 120 will be described hereinafter with reference to FIG. 7A. According to some examples, the machine learning model 120 can convert a design image of an overlay target into at least one simulated image (simulating a SEM image of the overlay target) using the methods described in U.S. Pat. No. 11,562,476 (content of this patent is incorporated herein by reference), or U.S. Ser. No. 18/076,324 (content of this patent application is incorporated herein by reference).

According to some examples, it is possible, for a given overlay target, to simulate images for different values of the parameters of the electron beam examination system (for example, different beam energies, different pixel sizes, etc.) and/or for different values of the overlay. For each set of values, different simulated images can be obtained for a given overlay target. In other words, for a given overlay target, it is possible to obtain a set of a plurality of different (simulated) images, wherein each (simulated) image is associated with a different set of overlay values and/or different parameters of the electron beam examination system. This will be discussed hereinafter with reference to FIG. 5A.

The method of FIG. 3 further includes (operation 320), for each given overlay target, using the simulated image to determine, before actual manufacturing of the given overlay target, data informative of at least one simulated overlay in the image. Data informative of at least one simulated overlay includes one or more overlay values (designated as simulated overlay value(s)) of the given overlay target, as determined in the simulated image. Operation 320 can include feeding the simulated image (such as simulated image 430) to the overlay measurement software 115, to determine simulated overlay value(s). As mentioned above, for a given simulated image, the overlay measurement software 115 may determine a plurality of overlay values, since the overlay may differ between the pairs of layers, and/or depending on the axis (X or Y axis, in the plane of the layer).

The method of FIG. 3 further includes (operation 330) using the data informative of the at least one simulated overlay of each given overlay target to select at least one optimal overlay target among the plurality of different overlay targets. At this stage, the candidate overlay targets (from which design data have been obtained at operation 300) have not necessarily been manufactured, and it is desired to predict which candidate overlay target(s) will be (upon their manufacturing on a specimen) the most optimal in order to obtain accurate overlay measurements.

According to some examples, each given overlay target is associated with at least one given overlay value in the design data. As mentioned above, different given overlay values can be defined for a given overlay target, since the overlay may differ depending the layers and/or depending on the axis. Operation 330 can include determining, for each given overlay target, data informative of a difference between the at least one simulated overlay and the at least one given overlay value. In other words, it is determined whether the expected overlay value (given overlay value defined in the design data) is visible/detectable in the simulated image of the given overlay target. Note that the simulated overlay value determined for a given pair of layers, or for a given axis, is compared to the given overlay value for the same given pair or layers, or for the same given axis. The optimal overlay target(s) can be selected as the candidate overlay target(s) for which the difference between the at least one simulated overlay and the at least one given overlay value is the smallest, or is below a threshold.

According to some examples, the optimal overlay target is selected as the overlay target for which the probability that the given overlay target, upon being manufactured according to the design data, provides measurement data in an overlay measurement process meeting a measurement quality criterion, is the highest. The measurement quality criterion can indicate that the overlay target is usable to determine accurate overlay measurements. The measurement quality criterion can indicate, for example, that the image (corresponding to the measurement data) obtained using the given overlay target (upon being manufactured) will enable measuring overlay with a required accuracy. It can also indicate that the variations in the overlay (which can be due e.g. to manufacturing errors) are sufficiently visible/measurable in the image (corresponding to the measurement data) obtained using the given overlay target.

Assume, for example, that a given overlay target is noted $OT_i$. Assume that each given overlay target $OT_i$ is associated with at least one given overlay value (expected overlay value) noted $OE_i$. For each given overlay target $OT_i$, a simulated image $I_i$ has been obtained, in which the at least one simulated overlay is noted $O_i$. For each image data $I_i$, data informative of a difference between the at least one simulated overlay $O_i$ and the at least one given overlay value $OE_i$ can be computed. In some examples, this data is computed, for each given overlay target $OT_i$, as follows: $|O_i-OE_i|$ (this is not limitative). The smaller $|O_i-OE_i|$, the higher the probability that the given overlay target, upon being manufactured according to the design data, provides measurement data in an overlay measurement process meeting the measurement quality criterion. The larger $|O_i-OE_i|$, the lower the probability that the given overlay target, upon being manufactured according to the design data, provides measurement data in an overlay measurement process meeting the measurement quality criterion.

According to some examples, it is possible to use the data informative of the at least one simulated overlay in the simulated image to update the design data of one or more of the candidate overlay targets, before their actual manufacturing (this is illustrated in reference 340 in FIG. 3). In particular, the data informative of a difference between the at least one simulated overlay and the at least one given overlay value computed for one or more of the candidate overlay targets, can be used to update the design data. Assume for example that for a given overlay target, it has been determined that the difference between the at least one simulated overlay and the at least one given overlay value is above a threshold, which indicates that the given overlay target is not a good candidate to enable, upon its manufacturing, accurate overlay measurements. This difference can be used as an indicator that the design data associated with this given overlay target needs to be modified, in order to improve the probability that this given overlay target will enable, upon its manufacturing, accurate overlay measurements. This modification of the design data can be performed, for example, by an engineer. Once the design data of one or more of the candidate overlay targets have been modified, thereby obtaining a new set of candidate overlay targets, it is possible to repeat operations 300 to 330 with this new set of candidate overlay targets. Note that the use of the machine learning model 120 to generate the simulated image enables performing these iterations, in some examples, within a short time.

As mentioned above, operation 330 enables determining an optimal overlay target, selected among the plurality of different overlay targets. This optimal overlay target can be output (for example on a display) to a user. According to some examples, once the optimal overlay target has been identified, the optimal overlay target can be manufactured (using its design data) on a specimen. Note that contrary to prior art methods, it is possible to predict in advance which overlay target(s) will provide accurate overlay measurements, and to manufacture only the optimal overlay target(s). As explained hereinafter (see FIG. 6), it is possible to acquire inspection image(s) of the manufactured optimal overlay target (acquired by an electron beam examination system—see reference 101 in FIG. 1) and use the inspection image(s) to determine data informative of the manufactured optimal overlay target.

For example, it is possible to use the inspection image to determine at least one actual value of the overlay (or a plurality of actual values, e.g. for different layers and/or for different axes), and to compare this at least one actual value with the at least one expected value of the overlay (as defined e.g., in the design data). Note that if an actual overlay value is determined for a given pair of layers or for a given axis, this actual overlay value is compared to the given overlay value of the design data associated with this given pair of layers or with this given axis. Feedback can be provided to a user. If there is a match (within a certain tolerance margin), this can indicate that the manufactured optimal overlay target is usable for determining accurate overlay measurements. According to some examples, if there is a mismatch, this can indicate that the process of FIG. 3 needs to be repeated with a different set of candidate overlay targets, among which one or more optimal target(s) have to be identified. Note that according to some examples, the design images of the manufactured overlay targets and their corresponding inspection images (acquired using the electron beam examination system) can also be used as additional data in the training set for training the machine learning model 120, thereby improving the accuracy of the model. The process can be repeated until a convergence criterion is met. The convergence criterion can define that the process can be stopped when an overlay target has been manufactured, for which the overlay measurement data meets the measurement quality criterion.

Figure 5A:
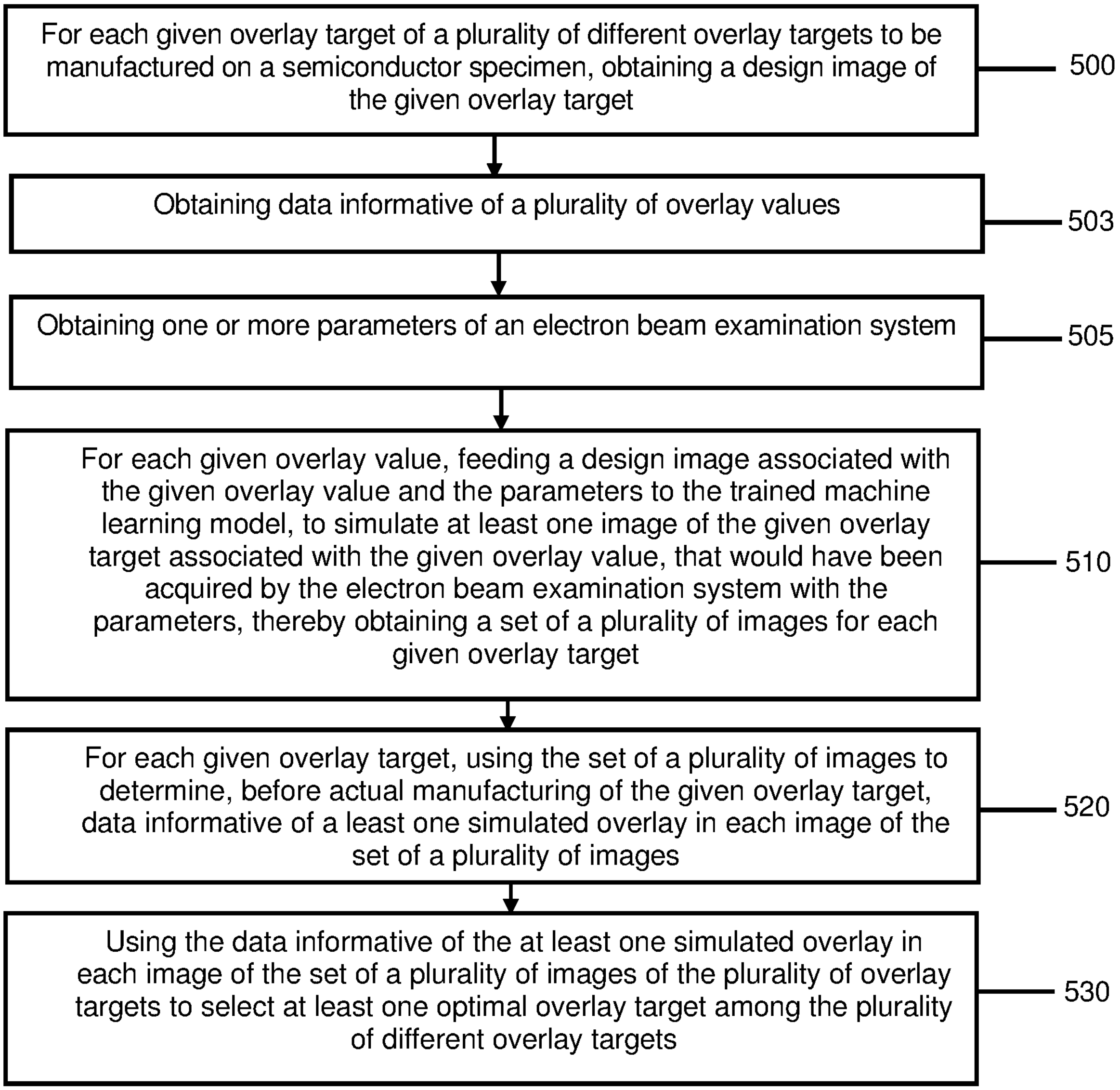
FIG. 5A illustrates a generalized flow-chart of another method of determining an optimal overlay target.

Attention is now drawn to FIG. 5A. The method of FIG. 5A enables testing whether different expected overlay values are measurable in the image simulated for each of the candidate overlay targets. This is one possible indicator that enables selecting the overlay target(s) which is/are the most adapted for providing accurate overlay measurements.

The method of FIG. 5A includes obtaining (operation 500), for each given overlay target of a plurality of different overlay targets to be manufactured on a semiconductor specimen, at least one design image of the given overlay target. Operation 500 is similar to operation 300 and is not described again.

The method of FIG. 5A further includes obtaining (operation 503) data informative of a plurality of overlay values. In some examples, data informative of a plurality of overlay values can be part of the design data. Data informative of a plurality of overlay values can include a range of values in which the overlay is expected to vary. This range of overlay values can reflect the expected range of the overlay error. For example, the manufacturer can indicate that for a given manufacturing process, it is expected to have an overlay error which varies between −2 nm and +2 nm (these values are not limitative). Note that the expected range of overlay values can be the same for all candidate overlay targets, or may differ between the candidate overlay targets. As mentioned above, for a given overlay target, different overlay values can be stored in the design data, since the overlay may differ for a given overlay target depending on the layers and/or depending on the axis. For each overlay value, the range of overlay values can define the expected range of error for this overlay value. Note that this range can be the same for each overlay value, or may differ depending on the overlay value.

In some examples, data informative of a plurality of overlay values can include a range of values for which it is desired to test whether the overlay target will provide, upon manufacturing, measurement data (images) which enable measuring these overlay values. This enables testing the robustness of each candidate overlay target to overlay variations.

Figure 5B:
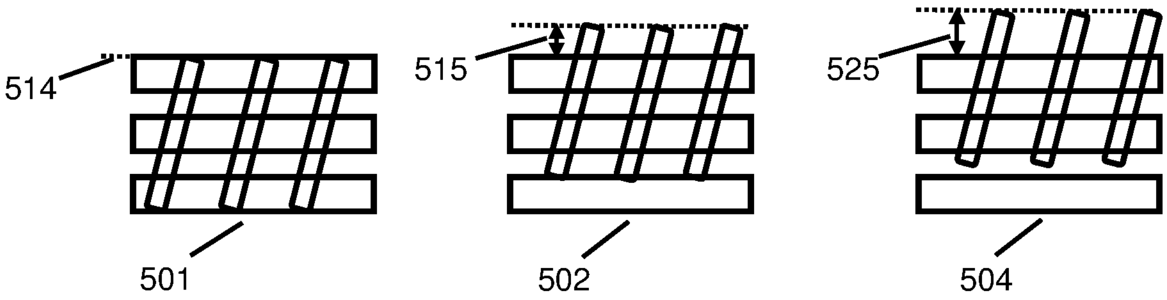
FIG. 5B illustrates different overlay targets associated with different values of overlay errors.

FIG. 5B illustrates an example of a given overlay target associated with three different values of the overlay (e.g., overlay error), between two layers and along the Y axis. On the left side of FIG. 5B (see reference 501), the overlay error 555 is equal to zero. In the center of FIG. 5B (see reference 502), the overlay error 515 has a first non-zero value. On the right side of FIG. 5B (see reference 504), the overlay error 525 has a second non-zero value, which is larger than the first value.

It is possible to use the plurality of overlay values to generate different design images of each overlay target (one per overlay value). For example, assume that a given design image has been provided for a nominal value of the overlay (at operation 500), it is then possible to make the overlay vary according to the range of variations to obtain different design images.

The method of FIG. 5A further includes (operation 505) obtaining one or more parameters of an electron beam examination system. Operation 505 is similar to operation 305 and is not described again.

The method of FIG. 5A further includes (operation 510), for each given overlay target, for each given overlay value of the one or more overlay values, feeding a design image associated with the given overlay value (that is to say a design image in which the overlay target is associated with the given overlay value) and the parameters to the trained machine learning model 120, to simulate at least one image of the given overlay target associated with the given overlay value, that would have been acquired by the electron beam examination system with the parameters, thereby obtaining a set of a plurality of (simulated) images. For each given overlay target, a set of a plurality of (simulated) images is therefore obtained (at least one simulated image per overlay value). As mentioned above, each simulated image can correspond to a 2D image, simulating a SEM image.

In some examples, it is possible to replace operations 500 and 503 by an operation in which a plurality of design images is directly obtained, one per different overlay value of the given overlay target.

Figure 5C:
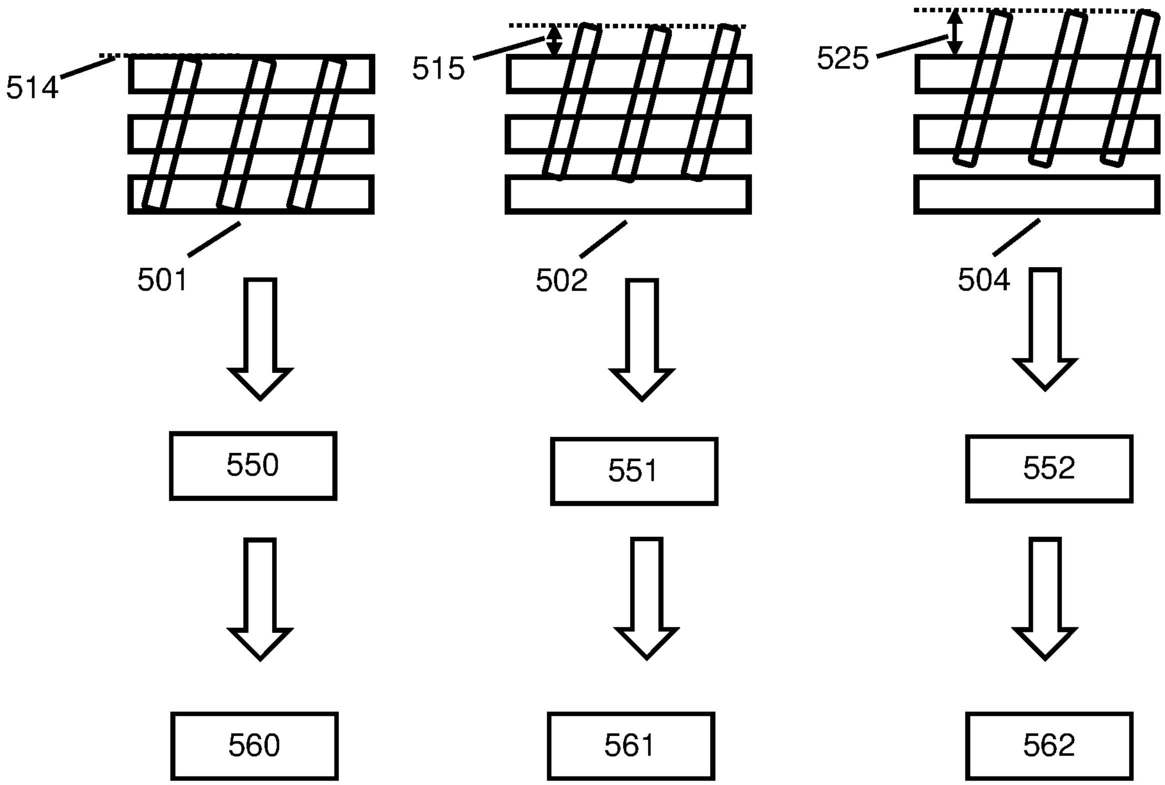
FIG. 5C illustrates different overlay targets associated with different values of overlay errors, together with corresponding simulated images.

A non-limitative example is illustrated in FIG. 5C, in which a given overlay target is associated with three different values 514, 515 and 525 of the overlay error, as explained with reference to FIG. 5B. As a consequence, three simulated images 550, 551 and 552 (one per overlay error) can be obtained using the machine learning model 120. In some examples, for each overlay error, two simulated images are generated by the machine learning model 120 (each simulated image simulating a different beam energy of the electron beam examination system).

The method of FIG. 5A further includes (operation 520), for each given overlay target, using the set of a plurality of simulated images to determine, before actual manufacturing of the given overlay target, data informative of at least one simulated overlay in each simulated image.

According to some examples, operation 520 can include determining at least one simulated overlay value in each simulated image of the set of a plurality of simulated images. Note that each simulated overlay value can be obtained by feeding each simulated image to the overlay measurement software 115. As explained hereinafter, it is therefore possible to determine whether the overlay value visible in the simulated image corresponds to the overlay value used to simulate the image.

In the example of FIG. 5C, simulated overlay value 560 is obtained for the simulated image 550, simulated overlay value 551 is obtained for the simulated image 561 and simulated overlay value 562 is obtained for the simulated image 552.

The method of FIG. 5A can further include using (operation 530) data informative of at least one simulated overlay determined in each image of the set of a plurality of images of each given overlay target (of the plurality of overlay targets) to select at least one optimal overlay target among the plurality of different overlay targets.

As mentioned above, each simulated image of the set of a plurality of simulated images has been obtained for a given overlay target associated with at least one given overlay value. Operation 530 can therefore include determining data informative of a difference between the at least one given overlay value and the at least one given simulated overlay value, for each simulated image of the set of a plurality of simulated images. In some examples, it is possible to determine an aggregation of all of these differences, for all simulated images of the set of a plurality of simulated images. This can be used to select at least one optimal overlay target among the plurality of different overlay targets.

It is therefore determined to what extent each overlay value is measurable/reflected in the corresponding (simulated) image. The higher the match between the (expected) overlay value and the simulated overlay value in the simulated image (for the different simulated images of the set of a plurality of simulated images), the higher the probability that the given overlay target, upon being manufactured according to the design data, will provide measurement data in an overlay measurement process meeting the measurement quality criterion. Indeed, a good match indicates that the variations in the overlay will be visible in the images of the manufactured overlay target, which is an indication that the overlay target will provide measurement data (images) in an overlay measurement process meeting the measurement quality criterion (in this case, the measurement quality criterion indicates that the variations in the overlay are measurable in the images). In some examples, the overlay target for which the different overlay values are the most visible/measurable in the corresponding simulated images, can be selected as the optimal overlay target.

Assume, for example, that a given overlay target is noted $OT_j$. Assume that the different overlay values (expected overlay errors) are noted $OE_i$ (with i from 1 to N). For each overlay value $OE_i$, a simulated image $I_{i,j}$ has been obtained, in which the simulated overlay is noted $O_{i,j}$. For each simulated image $ID_{i,j}$, operation 530 can include performing a comparison between the simulated overlay $O_{i,j}$ and the overlay value $OE_i$. Note that it is possible to aggregate this comparison for the different image data of a given overlay target:

$$\sum_{i=1}^{i=N} |O_{i,j} - OE_i|$$

(Equation 1—this formula is not limitative). The lower the value of this aggregation, the higher the probability that the given overlay target will enable accurate overlay measurements. The larger the value of this aggregation, the lower the probability that the given overlay target will enable accurate overlay measurements.

According to some examples, for each given overlay target, a score can be obtained which reflects to what extent the overlay value(s) are measurable/reflected in the image data. This score is informative of estimated probability that the given overlay target, upon being manufactured according to the design data, provides measurement data in an overlay measurement process meeting the measurement quality criterion. In some examples, Equation 1 can be used to attribute a score to each overlay target, which reflects the probability that it will enable, upon manufacturing, accurate overlay measurements. The overlay target(s) associated with the highest score can be selected as the optimal overlay target(s).

Figure 6:
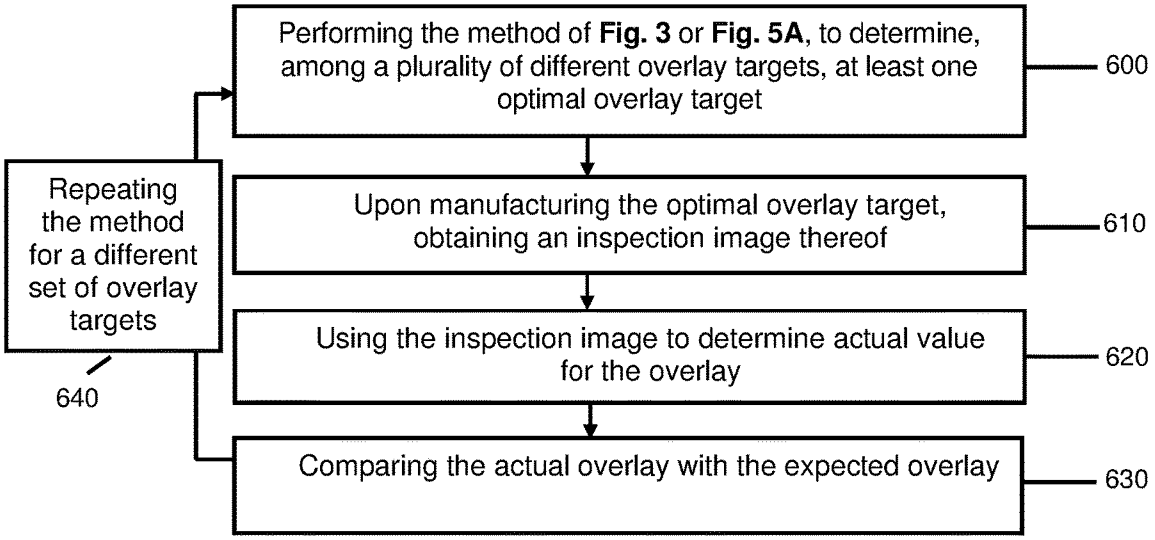
FIG. 6 illustrates a generalized flow-chart of an iterative method of determining an optimal overlay target.

Attention is now drawn to FIG. 6, which depicts an iterative process for generating optimal overlay targets.

The method of FIG. 6 includes (operation 600) performing the method of FIG. 3 or of FIG. 5A. As explained above, this enables determining at least one optimal overlay target.

The method of FIG. 6 further includes (operation 610), upon manufacturing of the optimal overlay target on a specimen, obtaining one or more inspection images of the manufactured optimal overlay target, using an electron beam examination system (see reference 102 in FIG. 1). Note that the electron beam examination system may be used with the parameters (acquisition parameters) used at operations 310 and 510.

The method of FIG. 6 further includes (operation 620) using the inspection image to compute at least one actual overlay (or a plurality of actual overlay values) in the inspection image. This can be performed by feeding the image to the overlay measurement software 115.

The at least one actual overlay value (determined based on the image of the manufactured optimal overlay target) can be compared to the at least one expected overlay value (as defined in the design data of the optimal overlay target).

If there is a match (within a certain tolerance) between the actual values of the overlay and the expected values of the overlay, this indicates that the manufactured optimal overlay target is indeed an adequate candidate for providing measurement data in an overlay measurement process meeting the measurement quality criterion. If there is a mismatch, this indicates that the manufactured optimal overlay target provides measurement data in an overlay measurement process which does not meet the measurement quality criterion. Therefore, the design data of the manufactured optimal overlay target needs to be modified. A user (such as an engineer) can determine updated design data. In some examples, the engineer can propose a new overlay target with this updated design data, which can be manufactured and tested, by acquiring an image thereof using the electron beam examination system and measuring actual values for the overlay. These actual values can be used to decide whether the new overlay target provides measurement data in an overlay measurement process which meets the measurement quality criterion. In some examples, the engineer can propose a new set of overlay targets, which is different (with different design data) from the original set of overlay targets used at the first iteration of the method of FIG. 6. The method of FIG. 6 can be repeated (see reference 640) with this new set of overlay targets, in order to select at least one new optimal overlay target among this new set, and verify, after its manufacturing, whether this new optimal overlay target enables accurate overlay measurements. The method of FIG. 6 can be repeated until a convergence criterion is met. The convergence criterion can define that the process can be stopped when an overlay target has been manufactured, for which the overlay measurement data meets the measurement quality criterion.

In some examples, it is possible to compute data informative of the quality of the inspection image (such as contrast of the image, signal to noise ratio of the image, number of features visible in the image, etc.) of the manufactured optimal overlay target. Note that the ability to perform accurate overlay measurements based on image(s) acquired from a manufactured overlay target depends inter alia on the quality of the image(s) that can be acquired from the manufactured overlay target. Indeed, the higher the quality of the image, the higher the ability to identify (by an image processing algorithm) features and/or layers, and/or the higher the ability to differentiate (by an image processing algorithm) between different features and/or different layers. This enables to verify whether the manufactured optimal overlay target enables accurate overlay measurements.

Figure 7A:
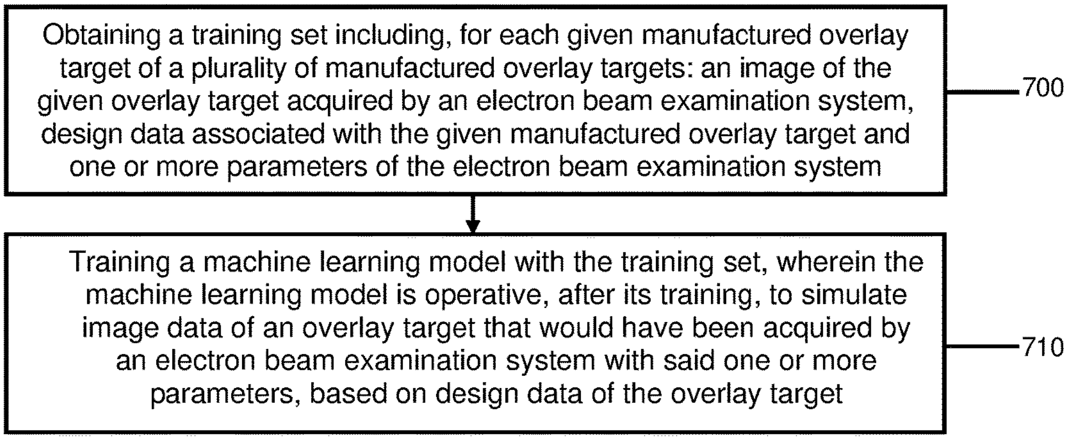
FIG. 7A illustrates a generalized flow-chart of a method of training a machine learning model to convert a design image into at least one simulated image.

Attention is now drawn to FIG. 7A, which describes a method of training the machine learning model 120.

Figure 7B:
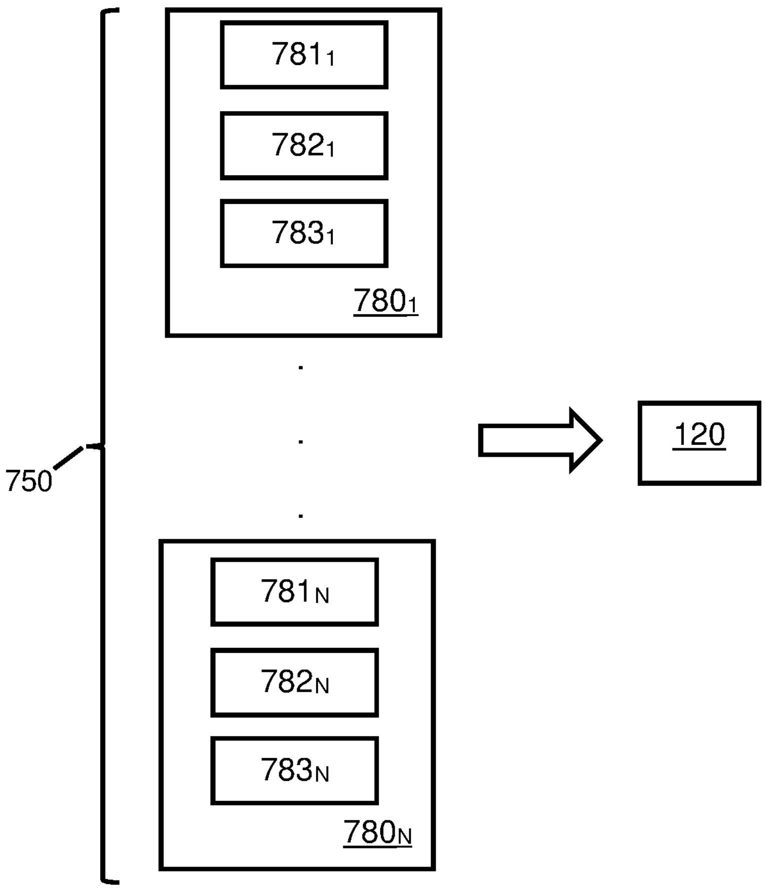
FIG. 7B illustrates a training set usable in the training method of FIG. 7A.

The method includes (operation 700) obtaining a training set (see reference 750 in FIG. 7B). The training set 750 can include, for each given manufactured overlay target of a plurality of manufactured overlay targets $\mathbf{780}_1$ to $\mathbf{780}_N$, at least one image (see $\mathbf{781}_1$ to $\mathbf{781}_N$) of the given overlay target acquired by an electron beam examination system (this real image corresponds to the target data of the training), a design image (see $\mathbf{782}_1$ to $\mathbf{782}_N$) associated with the given manufactured overlay target and one or more parameters (see $\mathbf{783}_1$ to $\mathbf{783}_N$) of the electron beam examination system (various examples of these parameters, corresponding to acquisition parameters, have been provided above). As mentioned above, the design image is informative of the geometry/layout of the different layers of each overlay target. In some examples, the at least one image (see $\mathbf{781}_1$ to $\mathbf{781}_N$) includes two SEM images: a backscattered image and a secondary electron image.

The method further includes feeding (operation 710) the training set 750 to the machine learning model 120 for its training. Methods such as Backpropagation can be used for the training (this not limitative). The machine learning model 120 is trained to simulate at least one image (in particular, a 2D image) of an overlay target that would have been acquired by an electron beam examination system with said one or more parameters, based on the design image of the overlay target. In some examples, the machine learning model 120 is trained to simulate two images (in particular, two 2D images) of an overlay target that would have been acquired by an electron beam examination system with said one or more parameters, based on a design image of the overlay target. In some examples, the machine learning model 120 is trained to generate a first simulated image simulating an image acquired by the SEM from secondary electrons, and a second simulated image simulating an image acquired by the SEM from backscattered electrons.

In some examples, the machine learning model 120 can be trained to simulate an image of an overlay target based on a design image, using the training method(s) described in U.S. Pat. No. 11,562,476. This is however not limitative.

Figure 8:
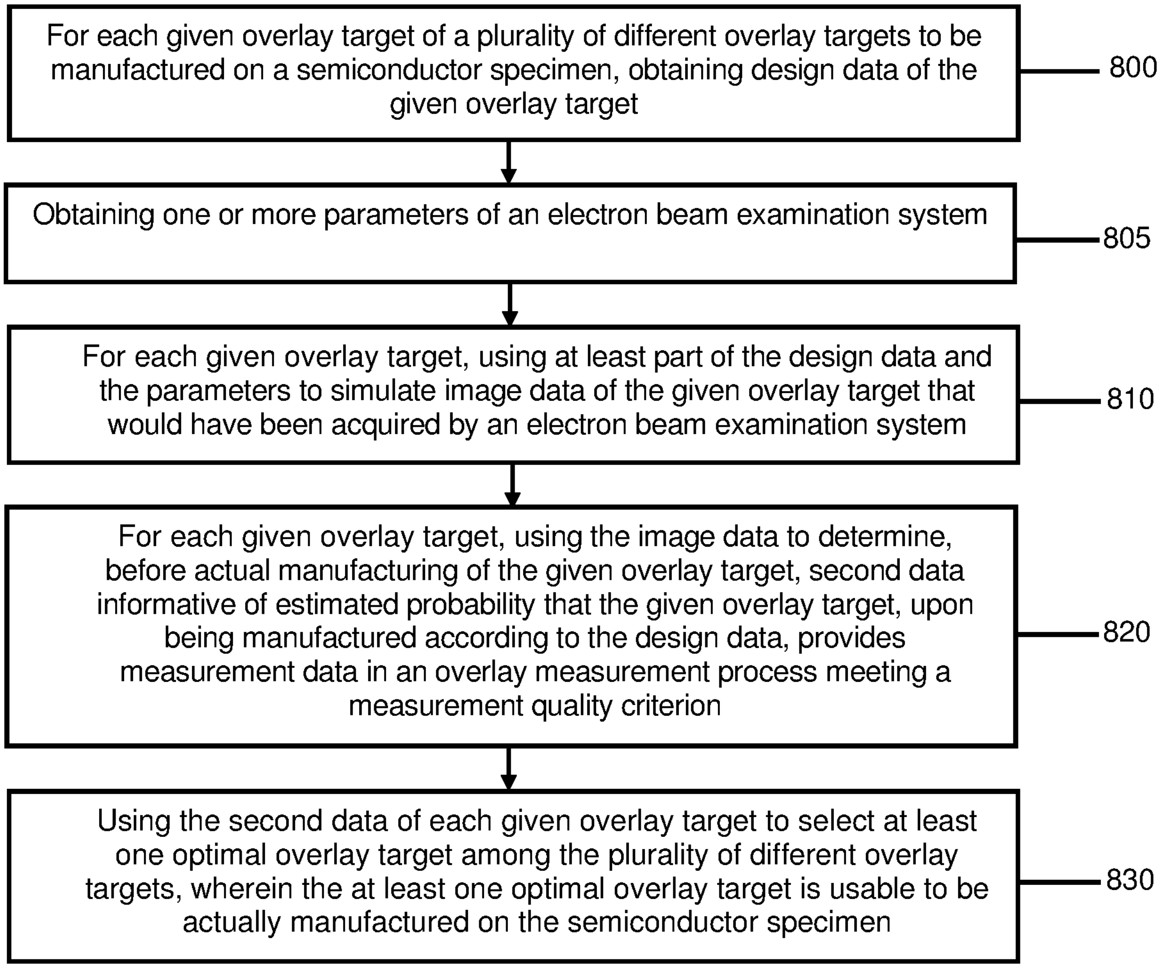
FIG. 8 illustrates a generalized flow-chart of another method of determining an optimal overlay target.

Attention is now drawn to FIG. 8.

In order to train the machine learning model 120, it is necessary to obtain real images of manufactured overlay targets. In order to manufacture overlay targets, it is possible to use for example the methods described in the US patent application of the Applicant, entitled "Optimal determination of an overlay target", and filed on Feb. 23, 2023 (filing number of the US patent application is not yet available). Content of this application is incorporated herein by reference. Note that other methods for manufacturing overlay targets can be used. FIG. 8 illustrates one of the methods described in this patent application.

The method of FIG. 8 includes obtaining (operation 800), for each given overlay target of the plurality of different overlay targets to be manufactured on a semiconductor specimen, design data of the given overlay target. The design data can include, for the given overlay target, properties of the stacked layers (e.g., materials, thickness, density), shapes of the features (e.g., lines, rectangles, etc.), layout of the features, frequency of repetition of the features, dimensions of the features (for example, critical dimension of the features), data informative of the three-dimensional profile of the features (e.g., top or bottom critical dimension, rounding, footing, asymmetry of the features, etc.), dimension of the overlay target, pitch (distance between clusters of features), etc. In some examples, the overlay targets can differ by at least one property, such as a type of material of one or more features, a thickness of one or more features or of one or more layers, a density of one or more features, geometry and/or layout of one or more features, etc.

The design data can include data in the X-Y plane (plane of each semiconductor layer), and along the Z axis (height axis, orthogonal to the plane of the semiconductor layers). The design data can be for example provided by a manufacturer, since the manufacturer has detailed knowledge of the parameters of the manufacturing process and/or the properties of the specimen to be manufactured. This is however not limitative. In some examples, the various candidate overlay targets can be designed to test overlay of a given manufacturing process.

According to some examples, the overlay targets can be associated with data informative of one or more different overlay values (overlay errors). The data informative of one or more overlay values may be part of the design data. An overlay error corresponds to a deviation from a desired alignment of layers and/or features. For example, a user (such as a manufacturer) can indicate that for a given manufacturing process, it is expected to have an overlay error which varies between −2 nm and +2 nm (these values are not limitative). Data informative of one or more overlay values can include this expected range.

The method of FIG. 8 further includes (operation 805) obtaining one or more parameters of an electron beam examination system. Examples of parameters have been provided above with reference to operation 305 in FIG. 3.

The method of FIG. 8 further includes (operation 810), for each given overlay target, using at least part of the design data to simulate image data (also called simulated image) of the given overlay target that would have been acquired by an electron beam examination system (see reference 101). In other words, before actual manufacturing of the given overlay target, it is possible to simulate an image of the given overlay target as acquired by the electron beam examination system. This simulation can be performed by the simulation software 112, which receives the parameters of the electron beam examination system (such as landing energy, pixel size, field of view, etc.), and the design data of the given overlay target. Note that the image data (simulated image) can include one or more 2D images, or one or more 1D images (electron yield or grey level intensity along one axis). Use of a 1D image reduces computation and can be adapted for an overlay target including features with some symmetry. In this case, a slice of the electron yield or of the grey level intensity along one axis (e.g., X axis) is already characteristic of the features.

According to some examples, it is possible, for a given overlay target, to simulate image data for different values of the parameters of the electron beam examination system (for example, different beam energies, different pixel sizes, etc.) and/or for different values of the design data (for example, different materials, different material densities, different overlay errors, etc.). For each set of values, different image data (different images) can be obtained for a given overlay target. In other words, for a given overlay target, it is possible to obtain a set of a plurality of different image data, wherein each image data is associated with a different set of design data and/or different parameters of the electron beam examination system.

The method of FIG. 8 further includes (operation 820), for each given overlay target, using the image data to determine second data, before actual manufacturing of the given overlay target. The second data are informative of estimated probability that the given overlay target, upon being manufactured according to the design data, provides measurement data in an overlay measurement process meeting a measurement quality criterion. The measurement quality criterion can indicate that the overlay target is usable to determine accurate overlay measurements. The measurement quality criterion can indicate, for example, that the image (corresponding to the measurement data) obtained using the given overlay target (upon being manufactured) will have a sufficient quality to enable measuring overlay with a required accuracy. It can also indicate that the variations in the overlay measurement data are sufficiently visible/measurable in the image (corresponding to the measurement data) obtained using the given overlay target. In other words, the second data can be used to predict whether the given overlay target will be adapted to obtain accurate overlay measurements.

The second data can be computed using the image data. Note that the ability to perform accurate overlay measurements based on image(s) acquired from a manufactured overlay target depends inter alia on the quality of the image(s) that can be acquired from the manufactured overlay target. Indeed, the higher the quality of the image, the higher the ability to identify (by an image processing algorithm) features and/or layers, and/or the higher the ability to differentiate (by an image processing algorithm) between different features and/or different layers. As a consequence, according to some examples, the second data can include data informative of the quality of the image data, which provides an estimate of the quality of the image that will be acquired by the electron beam examination system from the given overlay target upon its manufacturing (and, in turn, of the probability to obtain accurate overlay measurements with this given overlay target).

Data informative of the quality of the image data can include various attributes such as the contrast of the image data, the number of features visible in the image data (which can be compared to the true number of features of the overlay target), signal to noise ratio of the image data, or any other adapted parameter usable to characterize the quality of the image data. For some of the attributes, the higher the value of the attribute (such as contrast, signal to noise ratio, etc.), the higher the probability that the given overlay target, upon being manufactured according to the design data, provides measurement data in an overlay measurement process meeting the measurement quality criterion.

The method of FIG. 8 further includes (operation 830) using the second data of each given overlay target to select at least one optimal overlay target among the plurality of different overlay targets. At this stage, the candidate overlay targets (from which design data have been obtained at operation 800) have not necessarily been manufactured, and it is desired to predict which candidate overlay target(s) will be (upon their manufacturing on a specimen) the most optimal in order to obtain accurate overlay measurements. For each given overlay target, second data have been computed, which are usable to predict which overlay target(s) (designated as optimal overlay measurements) are the most promising to enable accurate overlay measurements.

According to some examples, for each given overlay target, the second data can be used to compute a score (aggregating the different values obtained for the second data), which indicates the probability that the overlay target will be associated (upon its manufacturing on a specimen) with accurate overlay measurements. For example, assume that for each image data, contrast and signal to noise ratio have been computed. A score can be computed which reflects the value of the contrast and the value of the signal to noise ratio. In this example, the higher the values of the contrast and of the signal to noise ratio, the higher the score, and the lower the values of the contrast and of the signal to noise ratio, the lower the score. Note that a different weight (or the same weight) can be assigned to each attribute. The value of the contrast can be, in some examples, scaled with respect to a reference value, in order to be comparable with other contrast values (for example, the contrast can be scaled within a range between 0 and 100%). The same applies to the signal to noise ratio, or to other attributes. Note that the score can be computed using different attributes of the second data and/or with a different number of attributes of the second data.

According to some examples, operation 830 can include selecting the candidate given overlay target(s) with the highest score as the optimal overlay target(s). The optimal overlay target, selected among the plurality of different overlay targets, can be output (for example on a display) to a user.

According to some examples, once the optimal overlay target has been identified, the optimal overlay target can be manufactured (using its design data) on a specimen. It is then possible to acquire inspection image(s) of the manufactured optimal overlay target, using an electron beam examination system. These inspection images can be used for various purposes, such as building a training set 750 to train the machine learning model 120 (see reference 781$_1$ to 781$_N$781$_1$ to 781$_N$), and/or to determine whether the manufactured optimal overlay provides accurate overlay measurements. This can include determining actual values of attributes (contrast, signal to noise ratio, etc.) used in the second data, and determining whether they meet a quality threshold. In some examples, if the actual values of the attributes do not meet the quality threshold, it is possible to repeat the method of FIG. 8 with a different set of overlay targets (with different design data), until an adequate overlay target is identified.

In some examples, it is possible to determine overlay measurement data using the image(s) of the manufactured optimal overlay target, and to determine whether the overlay measurement data meets the measurement quality criterion. For example, assume that it is known that the manufactured optimal overlay target is associated with a given value of the overlay between two layers. The overlay can be measured using the image of the manufactured optimal overlay target, and compared with the given value: a match (within a certain tolerance margin) indicates that the measurement quality criterion is met, whereas a mismatch indicates that the measurement quality criterion is not met.

It is to be understood that the invention is not limited in its application to the details set forth in the description contained herein or illustrated in the drawings.

The processing circuitry 104 can comprise, for example, one or more processors operatively connected to one or more computer memories loaded with executable instructions for executing operations, as further described below. The processing circuitry encompasses a single processor or multiple processors, which may be located in the same geographical zone, or may, at least partially, be located in different zones, and may be able to communicate together.

The one or more processors referred to herein can represent one or more general-purpose processing devices such as a microprocessor, a central processing unit, or the like. More particularly, a given processor may be one of: a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a network processor, or the like. The one or more processors are configured to execute instructions for performing the operations and steps discussed herein.

The memories referred to herein can comprise one or more of the following: internal memory, such as, e.g., processor registers and cache, etc., main memory such as, e.g., read-only memory (ROM), flash memory, dynamic random access memory (DRAM) such as synchronous DRAM (SDRAM) or Rambus DRAM (RDRAM), etc.

It is to be noted that while the present disclosure refers to the processing circuitry 104 being configured to perform various functionalities and/or operations, the functionalities/operations can be performed by the one or more processors of the processing circuitry 104 in various ways. By way of example, the operations described hereinafter can be performed by a specific processor, or by a combination of processors. The operations described hereinafter can thus be performed by respective processors (or processor combinations) in the processing circuitry 104, while, optionally, at least some of these operations may be performed by the same processor. The present disclosure should not be limited to be construed as one single processor always performing all the operations.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A system comprising one or more processing circuitries, wherein the one or more processing circuitries are operative to implement a trained machine learning model, wherein the one or more processing circuitries are configured to:

for each given overlay target of a plurality of different overlay targets to be manufactured on a semiconductor specimen, said given overlay target comprising a plurality of stacked semiconductor layers:

obtain a design image of the given overlay target, informative of geometry of the given overlay target, prior to manufacture of the given overlay target, feed the design image to a trained machine learning model, to simulate at least one image of the given overlay target that would have been acquired by an electron beam examination system, prior to manufacture of the given overlay target, use the at least one image to determine, prior to manufacture of the given overlay target, data informative of at least one simulated overlay in the at least one image, and use the data informative of the at least one simulated overlay of each given overlay target to select at least one optimal overlay target among the plurality of different overlay targets, wherein the at least one optimal overlay target is usable to be actually manufactured on the semiconductor specimen.

2. The system of claim 1, configured to:

obtain one or more parameters of the electron beam examination system, and feed the one or more parameters and the design image to the trained machine learning model, to simulate the at least one image of the given overlay target that would have been acquired by an electron beam examination system with said one or more parameters.

3. The system of claim 1, wherein each given overlay target is associated with at least one given overlay value in the design image, wherein the system is configured to determine, for at least one given overlay target, data informative of a difference between the at least one simulated overlay and the at least one given overlay value, and to use the data informative of a difference between the at least one simulated overlay and the at least one given overlay value of the at least one given overlay target to update design image associated with the at least one given overlay target.

4. The system of claim 1, wherein each given overlay target is associated with at least one given overlay value in the design image, wherein the system is configured to determine, for each given overlay target, data informative of a difference between the at least one simulated overlay and the at least one given overlay value and use said data to select said at least one optimal overlay target among the plurality of different overlay targets.

5. The system of claim 1, configured to:

for at least one given overlay target:

for each given overlay value of a plurality of overlay values, feed a design image associated with the given overlay value to the trained machine learning model, to simulate an image of the given overlay target associated with the given overlay value, that would have been acquired by the electron beam examination system, thereby obtaining a set of a plurality of images, and prior to manufacture of the given overlay target, determine, in each image of the set of a plurality of images, data informative of at least one given simulated overlay in the image.

6. The system of claim 5, configured to determine, for each given overlay target, for each given overlay value of the plurality of overlay values, data informative of a difference between the given simulated overlay and the given overlay value, and use said data to select the at least one optimal overlay target among the plurality of different overlay targets.

7. The system of claim 1, configured to, upon manufacturing of the optimal overlay target:

obtain an inspection image of the optimal overlay target acquired using an electron beam examination system, and determine at least one actual overlay based on the inspection image.

8. The system of claim 7, wherein the optimal overlay target is associated with at least one given overlay value in the design image, wherein the system is configured to compare the at least one actual overlay with the at least one given overlay value associated with the optimal overlay target.

9. The system of claim 7, configured to determine data informative of a quality of the inspection image.

10. The system of claim 1, wherein the system enables user modification of a level of noise present in the at least one image generated by the machine learning model.

11. The system of claim 1, configured to perform a sequence comprising:

(1) for each given overlay target of a first plurality of different overlay targets to be manufactured on a semiconductor specimen, said given overlay target comprising a plurality of stacked semiconductor layers:

obtain a design image of the given overlay target, feed at least part of the design image to the trained machine learning model, to simulate at least one image of the given overlay target that would have been acquired by an electron beam examination system, use the at least one image to determine, prior to manufacture of the given overlay target, data informative of at least one simulated overlay in the image data, and use the data informative of at least one simulated overlay of each given overlay target to select at least one optimal overlay target among the first plurality of different overlay targets, (2) upon manufacturing of the optimal overlay target, obtain an inspection image thereof, and use the inspection image to determine at least one actual overlay value;

(3) repeat (1) for a second plurality of overlay targets, different from the first plurality of different targets.

12. The system of claim 11, configured to perform a comparison between the at least one simulated overlay of the optimal overlay target with the at least one actual overlay value of the optimal overlay target, and output data informative of the comparison.

13. The system of claim 1, wherein the trained machine learning model has been trained using a training set including, for each given manufactured overlay target of a plurality of manufactured overlay targets: at least one image of the given manufactured overlay target acquired by an electron beam examination system, a design image associated with the given manufactured overlay target and one or more parameters of the electron beam examination system.

14. The system of claim 13, wherein at least one manufactured overlay target has been selected, before its manufacturing, among a plurality of different overlay targets to be manufactured on a semiconductor specimen, using operations comprising, for each given overlay target of the plurality of different overlay targets:

obtaining design image of the given overlay target, using at least part of the design image to simulate image data of the given overlay target that would have been acquired by an electron beam examination system, using the image data to determine, prior to manufacture of the given overlay target, second data informative of estimated probability that the given overlay target, upon being manufactured according to the design image, provides measurement data in an overlay measurement process meeting a measurement quality criterion, and using the second data of each given overlay target to select at least one optimal overlay target among the plurality of different overlay targets, wherein the at least one optimal overlay target corresponds, upon its manufacturing, to the at least one manufactured overlay target.

15. A method comprising, by one or more processing circuitries:

for each given overlay target of a plurality of different overlay targets to be manufactured on a semiconductor specimen, said given overlay target comprising a plurality of stacked semiconductor layers:

obtaining a design image of the given overlay target, informative of geometry of the given overlay target, prior to manufacture of the given overlay target, feeding at least part of the design image to a trained machine learning model, to simulate at least one image of the given overlay target that would have been acquired by an electron beam examination system, prior to manufacture of the given overlay target, using the at least one image to determine, prior to manufacture of the given overlay target, data informative of at least one simulated overlay in the image, and using the data informative of the at least one simulated overlay of each given overlay target to select at least one optimal overlay target among the plurality of different overlay targets, wherein the at least one optimal overlay target is usable to be actually manufactured on the semiconductor specimen.

16. The method of claim 15, comprising:

obtaining one or more parameters of the electron beam examination system, and feeding the one or more parameters and the design image to the trained machine learning model, to simulate the at least one image of the given overlay target that would have been acquired by an electron beam examination system with said one or more parameters.

17. The method of claim 15, wherein each given overlay target is associated with at least one given overlay value in the design image, wherein the method comprises determining, for at least one given overlay target, data informative of a difference between the at least one simulated overlay and the at least one given overlay value, and using the data informative of a difference between the at least one simulated overlay and the at least one given overlay value of the at least one given overlay target to update design image associated with the at least one given overlay target.

18. The method of claim 15, wherein each given overlay target is associated with at least one given overlay value in the design image, wherein the method comprises determining, for each given overlay target, data informative of a difference between the at least one simulated overlay and the at least one given overlay value and use said data to select said at least one optimal overlay target among the plurality of different overlay targets.

19. The method of claim 15, comprising:

obtaining data informative of a plurality of overlay values, for at least one given overlay target:

for each given overlay value of the plurality of overlay values, feeding at least part of the design image to the trained machine learning model, to simulate an image of the given overlay target associated with the given overlay value, that would have been acquired by the electron beam examination system, thereby obtaining a set of a plurality of images, and prior to manufacture of the given overlay target, determine, in each image of the set of a plurality of images, data informative of at least one given simulated overlay in the image.

20. A non-transitory computer readable medium comprising instructions that, when executed by one or more processors, cause the one or more processors to perform:

for each given overlay target of a plurality of different overlay targets to be manufactured on a semiconductor specimen, said given overlay target comprising a plurality of stacked semiconductor layers:

obtaining a design image of the given overlay target, informative of geometry of the given overlay target, prior to manufacture of the given overlay target, feeding the design image to a trained machine learning model, to simulate at least one image of the given overlay target that would have been acquired by an electron beam examination system, prior to manufacture of the given overlay target, using the at least one image to determine, prior to manufacture of the given overlay target, data informative of at least one simulated overlay in the image, and using the data informative of the at least one simulated overlay of each given overlay target to select at least one optimal overlay target among the plurality of different overlay targets, wherein the at least one optimal overlay target is usable to be actually manufactured on the semiconductor specimen.

* * * * *